United States Patent
Wickert et al.

(10) Patent No.: US 8,087,290 B2
(45) Date of Patent: Jan. 3, 2012

(54) METHOD TO DIAGNOSE AN EXHAUST GAS SENSOR DISPOSED IN THE EXHAUST GAS REGION OF AN INTERNAL COMBUSTION ENGINE AND DEVICE FOR THE IMPLEMENTATION OF THE METHOD

(75) Inventors: Stefan Wickert, Albershausen (DE); Jochen Schoenthaler, Wimsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/904,763

(22) Filed: Sep. 27, 2007

(65) Prior Publication Data
US 2008/0148830 A1    Jun. 26, 2008

(30) Foreign Application Priority Data

Sep. 27, 2006 (DE) .......................... 10 2006 045 662
Feb. 9, 2007 (DE) .......................... 10 2007 006 487

(51) Int. Cl.
*G01M 15/10* (2006.01)
(52) U.S. Cl. .................................. 73/114.69; 73/114.77
(58) Field of Classification Search ............... 73/114.69, 73/114.71, 114.72, 114.73, 114.77
See application file for complete search history.

(56) References Cited

U.S. PATENT DOCUMENTS

| | | | |
|---|---|---|---|
| 6,735,939 B2 * | 5/2004 | Surnilla | 60/285 |
| 6,792,928 B2 * | 9/2004 | Yasui et al. | 123/688 |
| 7,387,011 B2 * | 6/2008 | Fujiki et al. | 73/23.32 |
| 2003/0097873 A1 * | 5/2003 | Surnilla | 73/118.1 |
| 2005/0005690 A1 * | 1/2005 | Maki | 73/118.1 |
| 2007/0227124 A1 * | 10/2007 | Fujiki et al. | 60/277 |
| 2009/0044612 A1 * | 2/2009 | Schoenthaler et al. | 73/114.71 |

FOREIGN PATENT DOCUMENTS

| | | |
|---|---|---|
| DE | 102 54 843 | 6/2004 |
| DE | 103 10 954 | 9/2004 |
| DE | 10 2004 048 136 | 4/2006 |
| DE | 10 2004 049 577 | 4/2006 |
| DE | 10 2004 051 747 | 4/2006 |
| DE | 10 2005 034 247 | 1/2007 |

* cited by examiner

*Primary Examiner* — Eric S McCall
(74) *Attorney, Agent, or Firm* — Merchant & Gould P.C.

(57) ABSTRACT

A method of performing a diagnosis of an exhaust gas sensor disposed in an exhaust gas region of an internal combustion engine testing the sensor to determine whether a change of at least one exhaust gas component, which is detectable by the exhaust gas sensor, results in an expected change of the sensor signal, and implementing the diagnosis if a specified change in at least one operating parameter of the internal combustion engine and/or at least one parameter of the exhaust gas in the running operation of the internal combustion engine are detected.

13 Claims, 2 Drawing Sheets

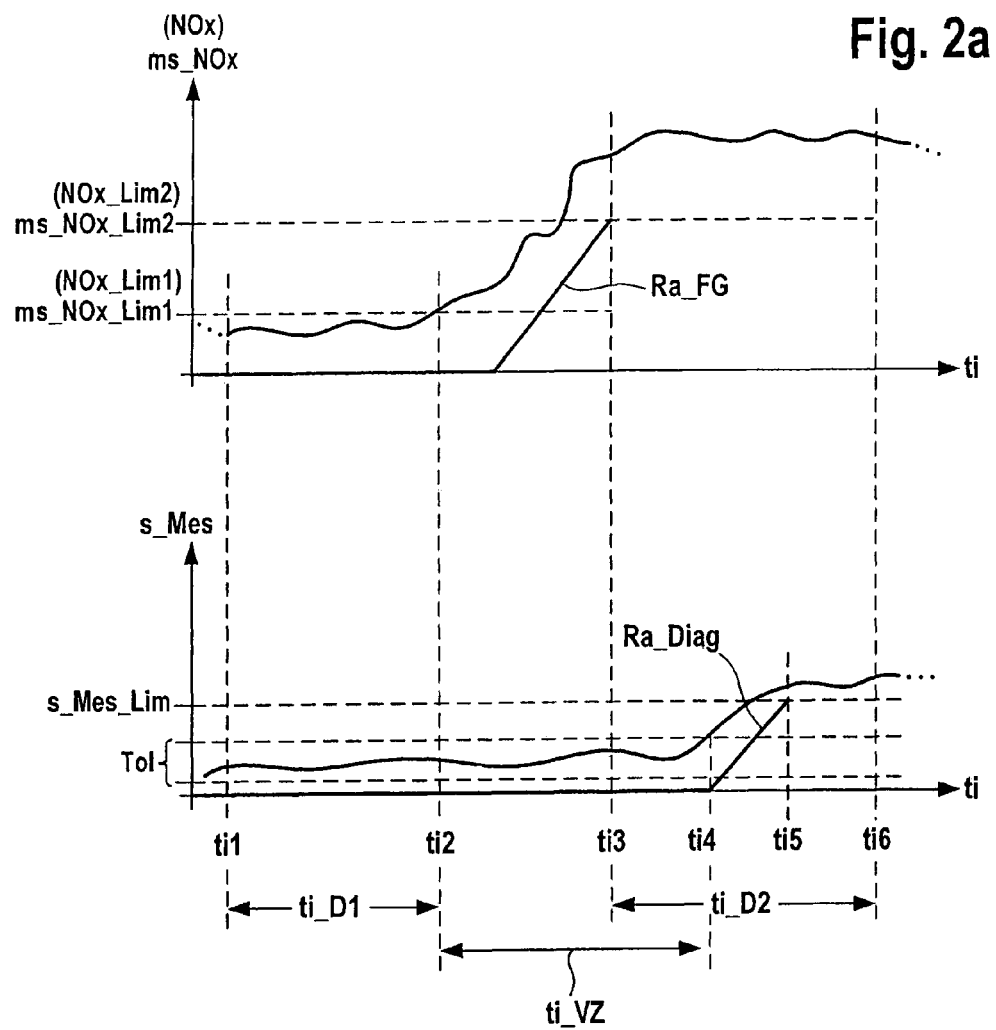

METHOD TO DIAGNOSE AN EXHAUST GAS SENSOR DISPOSED IN THE EXHAUST GAS REGION OF AN INTERNAL COMBUSTION ENGINE AND DEVICE FOR THE IMPLEMENTATION OF THE METHOD

BRIEF SUMMARY OF THE INVENTION

The invention proceeds from a method to diagnose an exhaust gas sensor disposed in the exhaust gas region of an internal combustion engine, whereby a test is made at said sensor to determine if a change in at least one exhaust gas parameter, which is detectable by the exhaust gas sensor, results in an expected change in the sensor signal; and the invention proceeds from a device for the implementation of the method according to the class of the independent claims.

A control unit program and a control unit program product are also subject matter of the invention.

In the German patent DE 103 10 954 A1, a method to diagnose a NOx sensor is described, in which at least a difference is constructed between signal values of the NOx sensor signal, which are acquired at different points in time. An error signal is transmitted if at least one difference undershoots a threshold value. The points in time are selected in such a way that a first point in time is, for example, specified before the regeneration of a NOx storage catalytic converter, and the second point in time is specified after the conclusion of the regeneration.

In the German patent DE 10 2004 048 136 A1, a method to diagnose a NOx sensor disposed in an exhaust gas region of an internal combustion engine is described, in which the diagnosis is implemented during the overtravel of a control unit after turning off the internal combustion engine. The diagnosis is preferably only then implemented if the air number Lambda of the exhaust gas exceeds a specified Lambda threshold value, which assures a sufficient flushing of the exhaust gas region after the engine has been turned off. A measurement ascertained using the diagnosis for the NOx sensor signal or an ascertained parameter from the NOx sensor signal can, for example, be compared with a threshold value, whereby the NOx sensor is recognized as defective if it is exceeded.

In the German patent DE 10 2004 049 577 A1, a method is described for operating an internal combustion engine, in whose exhaust gas region a NOx storage catalytic converter and a NOx sensor are disposed. Provision is made in the method for a first evaluation of the NOx sensor signal supplied by the NOx sensor to occur and for the signal offset of the NOx sensor signal to be ascertained as a function of the result of the first evaluation of the NOx sensor signal. In a subsequent second step, an evaluation of the NOx sensor signal is performed. As a function of the result of the second evaluation, an evaluation of the condition of the catalytic converter and/or a regeneration of the NOx storage catalytic converter are performed.

In the German patent DE 10 2004 051 747 A1 a method for operating an internal combustion engine is likewise described, in whose exhaust gas region a NOx storage catalytic converter and a NOx sensor are disposed. The method has a high degree of reliability by way of a correction possibility of the NOx sensor signal supplied by the NOx sensor. In an operating state of the NOx storage catalytic converter, in which the NOx storage catalytic converter has not any or a small NOx storage capability, a comparison of a measurement for the NOx concentration upstream before the NOx storage catalytic converter with the NOx sensor signal supplied by the NOx sensor disposed downstream after the NOx storage catalytic converter is implemented. The correction of the NOx sensor signal can be performed as a function of the result of the comparison.

In the German patent DE 10 2005 034 247 A1 a method for monitoring an exhaust gas threshold value of an internal combustion engine is described, in which the sensor signal supplied by the exhaust gas sensor is monitored, and an error signal is supplied when an exhaust gas threshold value has been exceeded. If the emissions predicted for a present operating state of the motor vehicle are ascertained with the aid of a model of the internal combustion engine and are compared with the signal of the exhaust gas sensor or a comparison value for the emissions derived from the sensor signal, the stipulated operating cycle of the motor vehicle during the certification of a threshold value monitoring system can be taken into account by way of the construction of the model. By the same means, in practical operation even when the operating states of the motor vehicle are atypical, a defective system can be reliably detected without leading to the errant releases of error signals.

The German patent DE 102 54 843 A1 finally describes a method for monitoring an exhaust gas treatment system, which is supplied with a reducing agent. In the diagnosis the quantity of the reducing agent, which is supplied, is changed. An error is detected if due to the specified change in the reducing agent, a signal of an exhaust gas sensor disposed after the exhaust gas treatment system does not likewise change as expected.

The task underlying the invention is to state a method and device, which allow for a diagnosis of an exhaust gas sensor disposed in the exhaust gas region of an internal combustion engine.

This task is solved in each case by the characteristics stated in the independent claims.

BACKGROUND OF THE INVENTION

The procedural approach according to the invention with the characteristics of the independent procedural claim has in contrast the advantage that the diagnosis can be implemented without an intervention into the normal operation of the internal combustion engine and without an intervention into a metering of a reducing agent into the exhaust gas region of the internal combustion engine, which if need be is present. In this way, a deterioration of the exhaust gas values resulting from the latter aforementioned intervention is avoided. Up until now said deterioration has been taken for granted. A suitable general set-up is being sought for the implementation of the diagnosis.

Advantageous modifications and embodiments of the procedural approach according to the invention result from the dependent claims.

Provision is made in one embodiment for the change in at least the one parameter of the exhaust gas to be detected using at least one calculated parameter of the exhaust gas. An additional exhaust gas sensor can be omitted with this step.

Provision is made in one embodiment for at least a measurement for the load of the internal combustion engine and/or for the rotational speed of the internal combustion engine and/or a measurement for the exhaust gas recirculation rate to be used as an operating parameter of the internal combustion engine. The aforementioned parameters are known by a control unit so that additional sensors are not required.

During the evaluation of the sensor signal supplied by the exhaust gas sensor, respectively of at least one measurement for the sensor signal, provision is advantageously made for the diagnosis to only then be implemented if at least the one operating parameter of the internal combustion engine and/or at least the one parameter of the exhaust gas initially lie below a first threshold value for a specified first time period and subsequently lie above a specified ramp. In this way it can be assured that a definite change in at least the one exhaust gas parameter, which can be detected by the exhaust gas sensor, exists upstream before the exhaust gas sensor.

Provision is made in a modification of this embodiment for the diagnosis to only then be implemented if at least the one operating parameter of the internal combustion engine and/or at least the one parameter of the exhaust gas subsequently lie above a second threshold value for a specified second time period. It can thereby be assured that a sufficiently long change existed.

Provision is preferably made for the diagnosis according to the invention to be carried out at a NOx sensor, which supplies a measurement for the NOx concentration as a sensor signal.

Provision is preferably made in the diagnosis for a test to determine whether the sensor signal, respectively at least a measurement for the sensor signal, increases.

Provision is made in one embodiment for the specification of a delay time, which takes into account the exhaust gas running time and the response time of the exhaust gas sensor.

Provision is made in the diagnosis for a test to determine whether the sensor signal lies above a specified ramp.

A test can be additionally made to determine whether the sensor signal lies above the sensor signal threshold value after exceeding a sensor signal threshold value or at least from a certain point in time up to the end of the second time period.

Provision is made in a more far-reaching diagnosis for a test to determine whether the sensor signal leaves a specified tolerance range at least from the beginning of the second specified time period onwards.

A reliable diagnosis is achieved with these individual steps or preferably with a combination of at least two of the steps.

The device according to the invention for the implementation of the method concerns a control unit, which is specially designed to implement the method.

The control unit preferably contains at least one electric memory, in which the procedural steps are deposited as the control unit program.

Provision is made in the control unit program for all of the steps of the method according to the invention to be executed if the program runs in a control unit.

The control unit program product according to the invention with a program code stored on a machine-readable carrier executes the method according to the invention if the program is executed in a control unit.

BRIEF DESCRIPTION OF THE DRAWINGS

Additional advantageous modifications and embodiments of the procedural approach according to the invention result from additional dependent claims. Examples of embodiment of the invention are depicted in the diagram and are explained in detail in the following description.

The following are shown.

DETAILED DESCRIPTION

Figure 1:
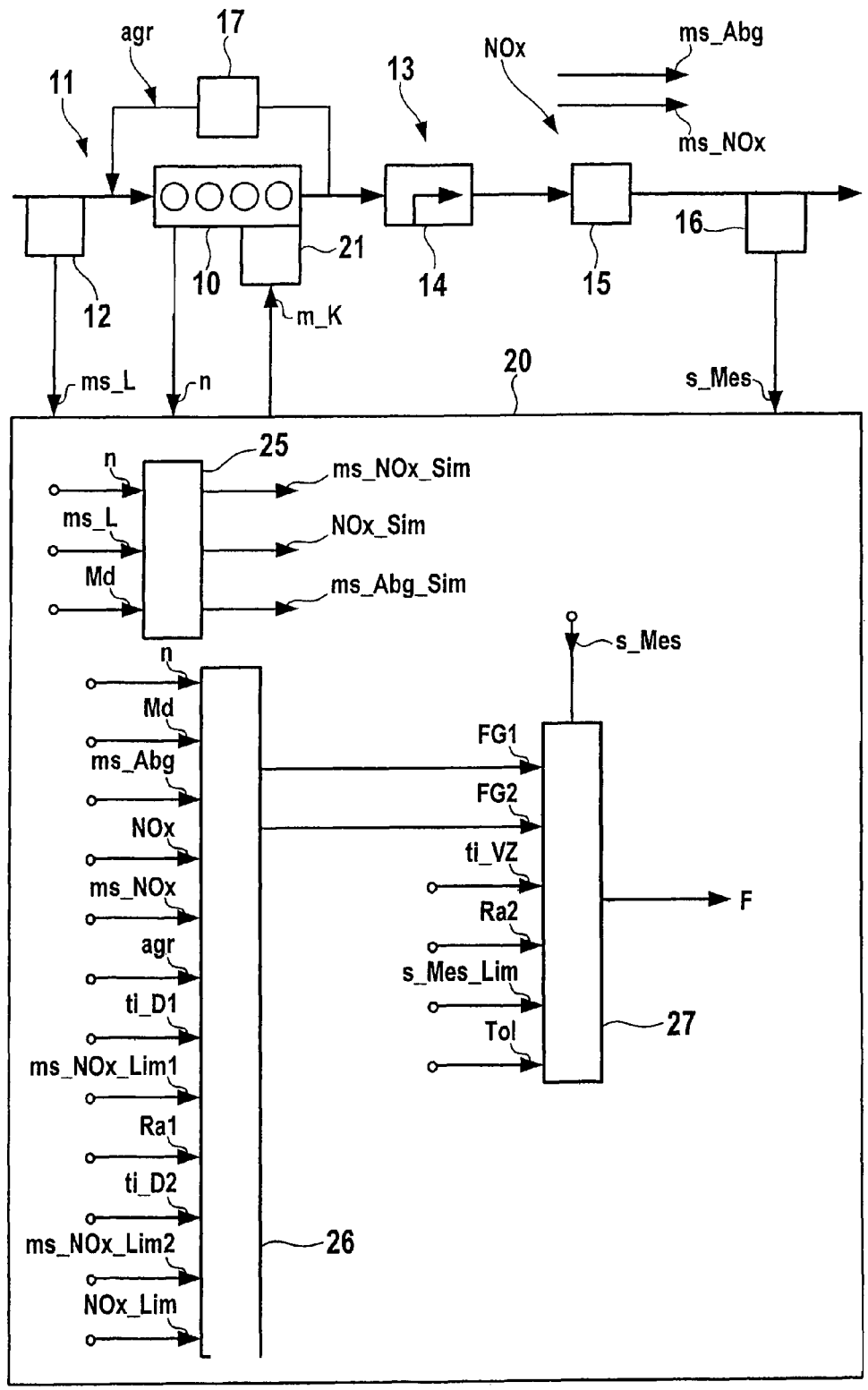
FIG. 1 a technical environment, in which a method according to the invention is operating and FIGS. 2a and 2b signal curves as a function of time.

FIG. 1 shows an internal combustion engine 10, in whose air intake region 11 an air sensor 12 is disposed and in whose exhaust region 13 a reagent substance introduction device 14, a catalytic converter 15 as well as an exhaust gas sensor 16 are disposed. Provision is made for an exhaust gas recirculation 17, which sets a specified exhaust gas recirculation rate agr, between the exhaust gas region 13 and the air intake region 11.

The air sensor 12 provides an air signal ms_L to the control unit 20, the internal combustion engine 10 a rotational speed n and the exhaust gas sensor 16 a sensor signal s_Mes. The control unit 20 provides a fuel signal m_K to a fuel metering device 21. In the exhaust gas region 13, an exhaust gas mass flow ms_Abg as well as at least a NOx mass flow ms_NOx with a NOx concentration NOx arise.

The control unit 20 contains a parameter ascertainment 25, an enabling ascertainment 26 as well as a sensor signal evaluation 27.

During the operation of the internal combustion engine 10, undesirable exhaust gas components emerge as a function of the operating state of the internal combustion engine 10. These undesirable components ought to be converted as extensively as possible by the catalytic converter 15. The exhaust gas sensor 16 acquires at least one of the exhaust gas components and supplies the sensor signal s_Mes for at least the one exhaust gas component.

The exhaust gas sensor 16 can, for example, be disposed immediately downstream after the internal combustion engine 10. The exhaust gas sensor 16 acquires in this case at least the emissions of the internal combustion engine 10 before catalytic conversion. In the example of embodiment depicted, it is assumed that the exhaust gas sensor 16 is disposed downstream after the catalytic converter 15.

In the example of embodiment depicted, provision is made for the reagent substance introduction device 14, which, for example, sprays a reducing agent into the exhaust gas region 13. The reducing agent is required in the catalytic converter 15, for example, to reduce the NOx. In this case, the catalytic converter 15 is embodied especially as a SCR catalytic converter. With the sensor signal s_Mes, an intervention can be made into the metering of the reagent substance.

On the basis of the importance of the sensor signal s_Mes, the demand for an on-board diagnosis of the exhaust gas sensor 16 can occur, which ought to assure that the sensor signal s_Mes is properly supplied.

In the example of embodiment depicted, the diagnosis of the exhaust gas sensor 16 is exemplary shown at the NOx mass flow ms_NOx, respectively at the NOx concentration, which occurs as a parameter of the exhaust gas in the exhaust gas region 13. The diagnosis likewise could be based upon, for example, a lambda sensor, a CO sensor, a particle sensor, an HC sensor, a reagent substance sensor and the like. Provided that provision is made for the catalytic converter 15 or another emission control device, for example a particle filter, a distinction can be made between at least one upstream exhaust gas parameter occurring before the catalytic converter 15 and one downstream exhaust gas parameter occurring after the catalytic converter 15. The upstream exhaust gas parameter could be measured with an additional exhaust gas sensor. It is, however, preferably calculated from known operating parameters of the internal combustion engine 10. Likewise a downstream exhaust gas parameter preferably is calculated using a catalytic converter model based on the upstream exhaust gas parameter.

The diagnosis according to the invention is based on a test to determine whether a change in at least one operating parameter of the internal combustion engine 10 and/or a change in at least one parameter of the exhaust gas result in an expected change in the sensor signal s_Mes.

A particular advantage of the procedural approach according to the invention results due to the fact that an intervention is not necessary into the control system of the internal combustion engine 10 or into the control system for the metering of a reagent substance into the exhaust gas region 13, for which if need be provision is made. Provision is made for the diagnosis to occur during the uninfluenced, running operation of the internal combustion engine 10, whereby a change is detected in at least the one operating parameter of the internal combustion engine 10 and/or in at least the one parameter of the exhaust gas It must initially be detected if a diagnosis can be implemented. For this purpose, provision is made for the enabling ascertainment 26, to which the engine rotational speed n, a measurement Md for the load of the internal combustion engine 10, the exhaust gas mass flow ms_Abg, the NOx mass flow ms_NOx, the NOx concentration NOx as well as the exhaust gas recirculation agr are provided. The enabling ascertainment 26 checks at least one input parameter for the presence of suitable conditions.

The measurement Md for the load of the internal combustion engine 10 as an example for an operating parameter of the internal combustion engine 10 corresponds, for example, to the position of an unspecified accelerator pedal of a motor vehicle provided that provision is made for the internal combustion engine 10 to be the power train in the motor vehicle. The fuel signal m_K can additionally be used as a measurement Md for the load of the internal combustion engine 10. The measurement Md for the load of the internal combustion engine furthermore reflects the torque to be generated or already generated by the internal combustion 10.

Because the exhaust gas recirculation rate agr likewise has a significant influence on at least one exhaust gas component, particularly the NOx concentration NOx, provision can alternatively or additionally be made for an evaluation of the exhaust gas recirculation rate agr to be a further example of a parameter of the internal combustion engine 10.

At least one parameter of the exhaust gas can alternatively or additionally next be checked to determine whether the diagnosis can be implemented.

Provision can be made for the exhaust gas mass flow ms_Abg to be a parameter of the exhaust gas. An evaluation of the NOx concentration NOx and/or the NOx mass flow ms_NOx can alternatively or additionally be performed. Below the description will be exemplary geared to the evaluation of the NOx concentration NOx and the NOx mass flow ms_NOx, which occur in the exhaust gas region 13, as exhaust gas parameters.

The NOx concentration NOx as well as the NOx mass flow ms_NOx can be ascertained in the parameter ascertainment 25 using at least the air signal ms_L and the measurement Md for the load of the internal combustion engine 10, if need be while taking into account the engine rotational speed n, and can then be provided as a calculated NOx concentration NOx_Sim, respectively as a calculated NOx mass flow ms_NOx_Sim. Provided that the catalytic converter 15 or another, respectively an additional, exhaust gas emission control device is present, the downstream parameters can be calculated from upstream parameters using a model of the catalytic converter 15, respectively of the exhaust gas emission control device.

Provision can initially be made for a test to determine whether the NOx mass flow ms_NOx and/or the NOx concentration NOx lies beneath a first specified NOx mass flow threshold value ms_NOx_Lim1, respectively beneath a first specified NOx concentration threshold value NOx_Lim1, for a first specified time period ti_D1. According to FIG. 2b, the first specified time period ti_D1 lies between a first and second point in time ti1, ti2. At the second point in time it is assumed according to FIG. 2a that the NOx mass flow ms_NOx exceeds the first NOx mass flow threshold value ms_NOx_Lim1, respectively the NOx concentration NOx exceeds the first NOx concentration threshold value NOx_Lim1. The exhaust gas mass flow ms_Abg can alternatively or especially additionally be taken as a basis for the test. For this reason, an exhaust gas mass flow threshold value, which is not depicted in the diagram, must be specified.

After this, provision can be made for a test to determine whether the increase in the NOx mass flow ms_NOx, respectively the NOx concentration NOx, exceeds a specified measurement. A test could, for example, be made for this purpose to determine whether the differential coefficient ascertained in a specified time exceeds a specified measurement. In the depicted example of embodiment, provision ought to be made for a test to determine whether the NOx mass flow ms_NOx, respectively the NOx concentration NOx, constantly lies above a specified ramp Ra_FG, which can be denoted as a diagnostic enabling ramp. The diagnostic enabling ramp Ra_FG can begin at the second point in time ti2 or thereafter. In the depicted example of embodiment, the diagnostic enabling ramp Ra_FG ends at a third point in time ti3. Already at the second point in time ti2, latest, however, at the third point in time ti3, the enabling ascertainment 26 provides a first enabling signal FG1, which is supplied to the sensor signal evaluation 27, provided the conditions are filled.

Furthermore, provision can be made for a test to determine whether the NOx mass flow ms_NOx constantly lies above a second NOx mass flow threshold value ms_NOx_Lim2 for a second specified time period ti_D2, respectively the NOx concentration NOx constantly lies above a second NOx concentration threshold value NOx_Lim2 for the second specified time period ti_D2. Also the test of the exhaust gas mass flow ms_Abg can alternatively or especially additionally be taken as a basis for this test. Also in this instance, a specification of an exhaust gas mass flow threshold value, which is not depicted in the diagram, is required. The second time period ti_D2 lies between the third point in time ti3 and the sixth point in time ti6. With the achievement of the sixth point in time ti6, the enabling ascertainment 26 provides a second enabling signal FG2, which likewise is supplied to the sensor signal evaluation 27 provided the condition is filled.

With the appearance of the first enabling signal FG1, the sensor signal evaluation 27 is initialized and now at the latest begins reading in and storing the sensor signal s_Mes, which in the depicted example of embodiment ought to at least correspond to a measurement for the NOx concentration NOx or a measurement for the NOx mass flow ms_NOx. The NOx mass flow ms_NOx can be calculated while taking into account the known exhaust gas mass flow ms_Abg_Sim, which, for example, is calculated by the parameter ascertainment 25, and can also be calculated from the NOx concentration NOx.

The evaluation of the sensor signal s_Mes preferably makes provision for a test to determine whether the increase reflects at least one measured exhaust gas component in the sensor signal s_Mes. Preferably provision is made for a delay time ti_VZ, which begins at a second point in time ti2 and ends at a fourth point in time ti4. The delay time ti_VZ can be established in such a way that the sensor signal s_Mes should have at the latest begun its increase when the delay time ti_VZ elapsed at the fourth point in time ti4. The delay time ti_VZ can take into account the exhaust gas running time and if need be the response time of the exhaust gas sensor 16.

The sensor signal s_Mes can as a result be checked from the fourth point in time ti4 onwards to determine whether, for example, a specified differential coefficient is exceeded within a specified time period. In the depicted example of embodiment, provision is made for a test to determine whether the sensor signal s_Mes constantly lies above a second specified ramp Ra_Diag and whether it can be denoted as a diagnostic ramp. The diagnostic ramp Ra_Diag begins at the fourth point in time and ends at a fifth point in time ti5.

Provision can additionally be made for a test to determine whether the sensor signal s_Mes constantly lies above the sensor signal threshold value s_Mes_Lim after the fifth point in time ti5 or after exceeding a sensor signal threshold value s_Mes_Lim for the first time up until the achievement of the sixth point in time ti6. The sixth point in time ti6 is—as previously described—established due to the fact that the second enabling signal FG2 has appeared.

The diagnosis can furthermore additionally make provision for a test to determine whether the sensor signal s_Mes has departed from a specified tolerance range Tol during the second time period ti_D2 or at least between the fourth and sixth point in time ti4, ti6.

Provided that provision is made for the catalytic converter 15, especially a SCR catalytic converter, the NOx mass flow threshold value ms_NOx_Lim2, respectively the NOx concentration threshold value NOx_Lim2, can be varied as a function of the operating conditions of the catalytic converter 15, particularly as a function of the operating temperature of the catalytic converter 15.

The diagnosis of the sensor signal s_Mes or at least a measurement for the sensor signal s_Mes begins to a certain extent in retrospect from the sixth point in time ti6 onwards with the appearance of the second enabling signal FG2, whereby the evaluation of the sensor signal s_Mes, however, already at the latest began with the appearance of the first enabling signal FG1 so that the result of the diagnosis is already made available immediately with the appearance of the sixth point in time ti6. Provided the sensor signal s_Mes fulfilled at least the one test condition, the diagnosis is concluded without the provision of an error signal F. Provided the sensor signal evaluation 27 has determined an error within the scope of the diagnosis, the sensor signal evaluation 27 makes the error signal F available.

The error signal F can be deposited into a memory, which can be read out when service is being performed on the internal combustion engine 10 or within the context of a maintenance check on the motor vehicle. The error signal F can alternatively or additionally be displayed, whereby a mechanic servicing the internal combustion engine 10 immediately receives an indication that an error has occurred.

The invention claimed is:

1. A method of performing a diagnosis of an exhaust gas sensor disposed in an exhaust gas region of an internal combustion engine, the method comprising:
    monitoring operating parameters of the engine and operating parameters of the exhaust gas during a running operation of the engine without a controlled intervention of the running operation, wherein the operating parameters of the exhaust gas include one of an exhaust gas mass flow, a NOx concentration and a NOx mass flow;
    determining during the running operation of the engine whether at least one of the monitored operating parameters of the engine and/or at least one of the monitored operating parameters of the exhaust gas changes in a specified range to verify a suitable engine operating condition for performing the diagnosis; and
    only upon verification of a suitable change of the engine operating condition or a suitable change of the at least one operating parameter of the exhaust gas for performing the diagnosis, enabling and evaluating a sensor signal of the exhaust gas sensor to determine whether a corresponding change in at least one exhaust gas component that is detectable by said sensor results in an expected change of the sensor signal.

2. A method according to claim 1, wherein a change in at least one parameter of the exhaust gas is determined using at least one calculated parameter of the exhaust gas.

3. A method according to claim 1, wherein a measurement for a load and/or a rotational speed of the internal combustion engine and/or a measurement for a exhaust gas recirculation rate are used as the operating parameter of the internal combustion engine.

4. A method according to claim 1, further comprising determining if the at least one operating parameter of the internal combustion engine and/or the at least one parameter of the exhaust gas lie beneath a first threshold value for a predetermined time period.

5. A method according to claim 1, further comprising determining if the at least one operating parameter of the internal combustion engine and/or the at least one parameter of the exhaust gas lie above a diagnostic enabling ramp after a predetermined time period.

6. A method according to claim 1, further comprising determining if the at least one operating parameter of the internal combustion engine and/or the at least one parameter of the exhaust gas subsequently lie above a threshold value for a predetermined time period.

7. A method according to claim 1, further comprising establishing at least one threshold value as a function of operating conditions of a catalytic converter disposed upstream before the exhaust gas sensor.

8. A method according to claim 1, further comprising correcting for an exhaust gas running time of the exhaust gas sensor.

9. A method according to claim 8, further comprising determining whether a measurement for the sensor signal lies above a sensor signal threshold value up until an end of a predetermined time period after a sensor signal threshold value has been exceeded or after a predetermined point in time.

10. A method according to claim 1, further comprising determining whether a measurement for the sensor signal lies above a diagnostic ramp.

11. A method according to claim 10, further comprising determining whether the measurement for the sensor signal departs from a tolerance range.

12. A method according to claim 10, further comprising determining whether the measurement for the sensor signal increases.

13. A device configured to perform a diagnosis of an exhaust gas sensor disposed in an exhaust gas region of an internal combustion engine, the device comprising a control unit configured to:
    monitor operating parameters of the engine and operating parameters of the exhaust as during a running operation of the engine without a controlled intervention of the running operation, wherein the operating parameters of the exhaust gas include one of an exhaust gas mass flow, a NOx concentration and a NOx mass flow;
    determine during the running operation of the engine whether the monitored operating parameters of the engine and/or the monitored operating parameters of the exhaust gas change in a specified range to verify a suitable engine operating condition for performing the diagnosis; and
    only upon verification of a suitable change of the engine operating condition or a suitable change of the operating parameters of the exhaust gas for performing the diagnosis, enable and evaluate a sensor signal of the exhaust gas sensor to determine whether a corresponding change in at least one exhaust gas component that is detectable by said sensor results in an expected change of the sensor signal.

* * * * *